US010867495B1

(12) United States Patent
Venetianer et al.

(10) Patent No.: US 10,867,495 B1
(45) Date of Patent: Dec. 15, 2020

(54) DEVICE AND METHOD FOR ADJUSTING AN AMOUNT OF VIDEO ANALYTICS DATA REPORTED BY VIDEO CAPTURING DEVICES DEPLOYED IN A GIVEN LOCATION

(71) Applicant: MOTOROLA SOLUTIONS, INC., Chicago, IL (US)

(72) Inventors: Peter Venetianer, McLean, VA (US); Yanyan Hu, Medford, MA (US); Kevin Piette, Carlisle, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/566,913

(22) Filed: Sep. 11, 2019

(51) Int. Cl.
*G08B 13/196* (2006.01)
*G06K 9/00* (2006.01)

(52) U.S. Cl.
CPC ... *G08B 13/19671* (2013.01); *G06K 9/00771* (2013.01); *G08B 13/19615* (2013.01); *G08B 13/19645* (2013.01); *G08B 13/19667* (2013.01); *G08B 13/19669* (2013.01)

(58) Field of Classification Search
CPC ........ G08B 13/19671; G08B 13/19667; G08B 13/19645; G08B 13/19615; G08B 13/19669; G06K 9/00771
USPC ........................................................ 348/143
See application file for complete search history.

(56) References Cited

U.S. PATENT DOCUMENTS

| | | | |
|---|---|---|---|
| 7,382,244 B1* | 6/2008 | Donovan | G08B 13/19656 340/506 |
| 9,158,975 B2* | 10/2015 | Lipton | G06K 9/00771 |
| 2010/0321183 A1* | 12/2010 | Donovan | H04N 5/23206 340/540 |
| 2012/0045090 A1* | 2/2012 | Bobbitt | G06T 7/74 382/103 |
| 2012/0288140 A1 | 11/2012 | Hauptmann et al. | |
| 2014/0118543 A1 | 5/2014 | Kerbs et al. | |
| 2015/0009331 A1* | 1/2015 | Venkatraman | B61L 23/041 348/148 |
| 2016/0117635 A1* | 4/2016 | Parker | G08B 13/19667 705/28 |

(Continued)

FOREIGN PATENT DOCUMENTS

WO 2017160170 A1 9/2017

*Primary Examiner* — Tung T Vo
(74) *Attorney, Agent, or Firm* — Raguraman Kumaresan (57) ABSTRACT

A process for adjusting an amount of video analytics data reported by video capturing devices deployed in a given location. In operation, an electronic computing device detects occurrence of an incident at an incident location based on processing video data or sensor data that are captured corresponding to the incident location. When it is determined that a video capturing device that is deployed within a predetermined distance from the incident location is currently configured with a second video analytics data reporting threshold that is greater than the first video analytics data reporting threshold, the electronic computing device transmits an instruction to the video capturing device to lower the second video analytics data reporting threshold to the first video analytics data reporting threshold and further report video analytics data corresponding to a video stream captured by the video capturing device as a function of the first video analytics data reporting threshold.

20 Claims, 5 Drawing Sheets

(56) References Cited

U.S. PATENT DOCUMENTS

| | | |
|---|---|---|
| 2016/0189531 A1 | 6/2016 | Modi et al. |
| 2017/0098162 A1* | 4/2017 | Ellenbogen ............ G06N 7/005 |
| 2018/0032819 A1 | 2/2018 | Citerin |
| 2018/0047173 A1 | 2/2018 | Chen et al. |
| 2019/0130583 A1* | 5/2019 | Chen .................. G06K 9/00711 |

* cited by examiner

DEVICE AND METHOD FOR ADJUSTING AN AMOUNT OF VIDEO ANALYTICS DATA REPORTED BY VIDEO CAPTURING DEVICES DEPLOYED IN A GIVEN LOCATION

BACKGROUND OF THE INVENTION

Security operators screen video streams captured by video cameras (e.g., closed-circuit television (CCTV) cameras) to remotely monitor areas for suspicious activities. Since manually screening large amount of video stream received from cameras is a tedious process for operators, security agencies have come to rely on video analytics systems that are programmed to automatically analyze the video stream and further provide alert to security officers when a suspicious activity is detected from the captured video data. However, different video analytics systems may be configured with different definitions for determining whether a given activity detected from the video stream is considered as a suspicious activity or not. Such default configuration of definitions at a particular video analytics system may avoid false alarms with respect to reporting of suspicious activities, but it is also possible that some unreported activities captured at a particular video camera may still be of interest to security agencies.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A video capturing device such as a video camera integrated with a video analytics engine is configured with a baseline video analytics data reporting threshold that determines whether a particular activity detected from video stream captured by the video camera is to be reported or not. The baseline video analytics data reporting threshold is often programmed to maintain a good balance between too many false alarms and too many missed detections. A low video analytics data reporting threshold may result in lots of false positives, which in turn may result in alerts being ignored by the security operators. However, in case some incident (e.g., a gunshot event) is detected, temporarily lowering the baseline video analytics data reporting threshold for one or more video cameras deployed near the incident scene and further temporarily (e.g., for a given period of time after the incident was reported) increasing the amount of video analytics data to be reported from the video cameras near the incident scene is helpful to security operators for identifying other events (that may be caused by the reported incident) of interest. Disclosed is an improved video analytics data reporting system that adjusts an amount of video analytics data (e.g., by lowering the video analytics data reporting threshold) reported by video capturing devices deployed in a given location.

One exemplary embodiment provides a method for adjusting an amount of video analytics data reported by video capturing devices deployed in a given location. The method includes: detecting, at an electronic computing device, occurrence of an incident at an incident location based on processing video data or sensor data that are captured corresponding to the incident location; identifying, at the electronic computing device, a video capturing device that is deployed within a predetermined distance from the incident location; determining, at the electronic computing device, a first video analytics data reporting threshold for reporting video analytics data from the video capturing device in response to the detected incident; determining, at the electronic computing device, whether the video capturing device is currently configured with a second video analytics data reporting threshold that is greater than the first video analytics data reporting threshold; and responsive to determining that the video capturing device is currently configured with a second video analytics data reporting threshold that is greater than the first video analytics data reporting threshold, transmitting, at the electronic computing device, an instruction to the video capturing device to lower the second video analytics data reporting threshold to the first video analytics data reporting threshold and further report video analytics data corresponding to a video stream captured by the video capturing device as a function of the first video analytics data reporting threshold.

Another exemplary embodiment provides an electronic computing device including an electronic processor and a communications unit communicatively coupled to the electronic processor. The electronic processor is configured to: detect occurrence of an incident at an incident location based on processing video data or sensor data that are captured corresponding to the incident location; identify a video capturing device that is deployed within a predetermined distance from the incident location; determine a first video analytics data reporting threshold for reporting video analytics data from the video capturing device in response to the detected incident; determine whether the video capturing device is currently configured with a second video analytics data reporting threshold that is greater than the first video analytics data reporting threshold; and responsive to determining that the video capturing device is currently configured with a second video analytics data reporting threshold that is greater than the first video analytics data reporting threshold, transmit, via the communications unit, an instruction to the video capturing device to lower the second video analytics data reporting threshold to the first video analytics data reporting threshold and further report video analytics data corresponding to a video stream captured by the video capturing device as a function of the first video analytics data reporting threshold.

Each of the above-mentioned embodiments will be discussed in more detail below, starting with an example system in which the embodiments may be practiced, followed by an illustration of processing steps for achieving the method of adjusting an amount of video analytics data reported by video capturing devices. Further advantages and features consistent with this disclosure will be set forth in the following detailed description, with reference to the figures.

Figure 1:
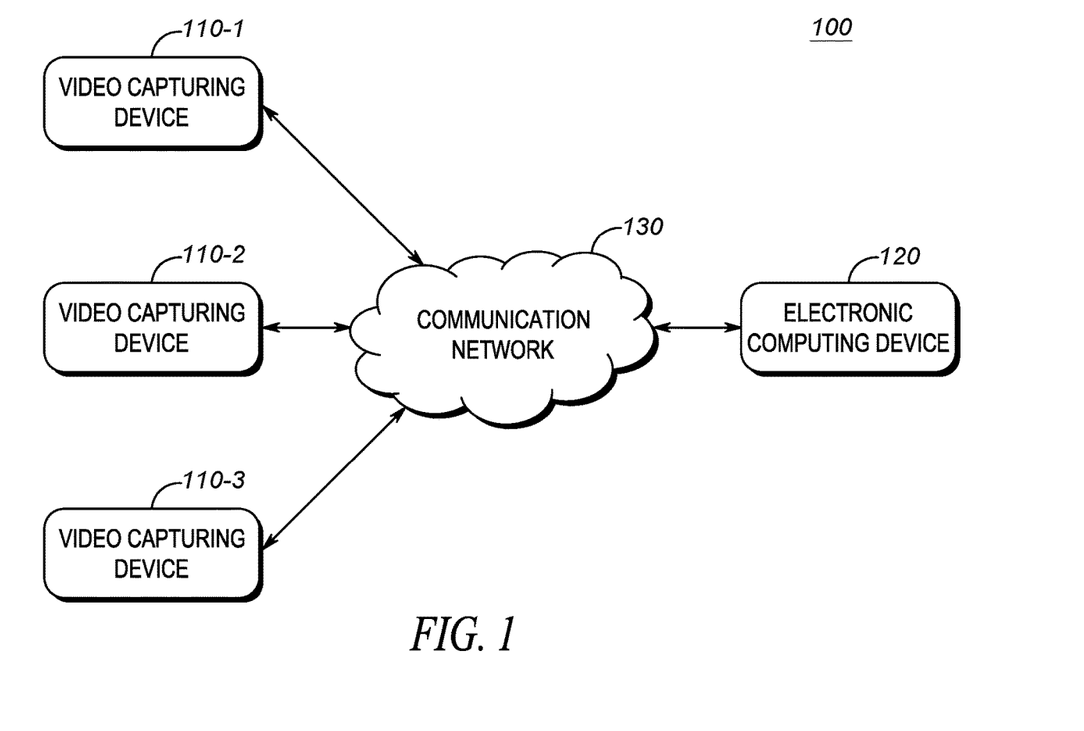
FIG. 1 is a system diagram illustrating a video analytics data reporting system in accordance with some embodiments.

Referring now to drawings and in particular to FIG. 1, a system diagram illustrates a video analytics data reporting system 100 including a plurality of video capturing devices 110-1, 110-2, and 110-3 and an electronic computing device 120. The plurality of video capturing devices 110-1, 110-2, and 110-3, can be interchangeably referred to, collectively, as video capturing devices 110, and generically as a video capturing device 110. Although, only three video capturing devices are shown in FIG. 1 for illustrative purpose, any number of video capturing devices 110 may be deployed in the system 100 in any number of locations. The video capturing device 110 includes a video camera (e.g., surveillance camera, vehicular camera, body worn camera, mobile phone camera, drone camera, and the like) that is configured to capture video stream corresponding to a field of view of the video camera. The video capturing device 110 includes or is in communication with a video analytics engine. In accordance with some embodiments, the video analytics engine is a software engine that is configured to analyze the video stream captured by the video camera and detect activity of interest (e.g., a person, object, or event) from the captured video stream. In one embodiment, the video analytics engine is programmed with a detection classifier that evaluates the video stream, for example, an image or part of an image of the video stream captured by the video camera to determine if an instance of a person, object, or event of interest that is defined in the detection classifier is detected or not from the evaluated video stream. In accordance with embodiments, each video analytics engine associated with the video capturing devices 110 is further programmed with a respective video analytics data reporting threshold that determines whether a detected person, object, or event of interest is to be reported or not, for example, for the purpose of alerting a security operator in case a suspicious person, object, or interest is detected.

In one embodiment, the video analytics data reporting threshold corresponds to a baseline confidence level at which a detected person, object, or event of interest can be reported. The baseline confidence level may be different for different types of detected person, object, or event of interest. In accordance with some embodiments, a video analytics data point extracted from the captured media stream may meet the video analytics data reporting threshold only when the video analytics data point is above the baseline confidence level. For example, the baseline confidence level may be set to require a 50% match in facial features between a person detected in the video data and a person of interest (e.g., a suspect). In this case, the facial features of a person detected from the captured video stream is identified and further quantized as one or more video analytics data points. As another example, the baseline confidence level may be set to require a 90% match between audio or video pattern extracted from video stream captured by the video camera and a predetermined audio or video signature of a typical gunshot event, where the audio or video pattern extracted from the video stream is identified and further quantized as one or more video analytics data points. In this example, when a person is detected with a confidence level (e.g., 95% match with facial features of the person of interest) that is same as or greater than the baseline confidence level of the video analytics data reporting threshold (e.g., required confidence level of 90% match with facial features of the person of interest), the video analytics engine associated with the video capturing device 110 reports video analytics data corresponding to the detected person of interest.

In another embodiment, the video analytics data reporting threshold may correspond to a combination of one or more qualifying metrics (e.g., speed level, rate of change of speed, sound intensity level, height, age, type or number of weapons or objects carried by a person, number of persons in a detected crowd or group, sensitivity level, a percentage reduction in threshold, etc.,) that determines whether a particular person, object, or event of interest detected from the video data captured by the video capturing device 110 is to be reported or not. As an example, the video analytics data reporting threshold may be set to require a minimum speed level of 60 miles per hour for a detected vehicle. In this case, when a vehicle is detected with a speed level of 85 miles per hour, the video analytics engine associated with the video capturing device 110 reports the detected vehicle because the speed level of the vehicle is greater than the minimum speed level of 60 miles per hour associated with the configured video analytics data reporting threshold. Alternatively, when a vehicle is detected with a speed level of 55 miles per hour, the video analytics engine does not report the detected vehicle because the speed level of vehicle is lower than the minimum speed level of 60 miles per hour associated with the configured video analytics data reporting threshold. However, in accordance with embodiments described herein, the video analytics engine may be instructed by the electronic computing device 120 to lower the video analytics data reporting threshold (for example, to a lowered video analytics data reporting threshold that requires reporting detected vehicles with minimum speed level of 40 miles per hour) when an incident of a particular type is detected in a location relative (e.g., in proximity) to the video capturing device 110.

In accordance with embodiments, the video analytics engine associated with the video capturing device 110 reports a detected person, object, or event of interest (i.e., with confidence level or qualifying metrics above the configured video analytics reporting data threshold) to a corresponding display or audio output device (e.g., monitored by a security operator) that is communicatively coupled to the video capturing device 110. The display or audio output device (not shown) is configured to playback an indication of a visual or audio alert corresponding to the reported video analytics data when particular video analytics data (i.e., a subset of the video analytics data extracted from the video stream for which video analytics data points are above the reporting threshold) is reported by the video capturing device 110. The video analytics data reported by the video analytics engine may include particular image or image sequences of the video data and/or metadata identifying features or characteristics (e.g., video analytics data points) about the particular person, object, or event of interest that is detected (with confidence level or qualifying metrics above the configured video analytics data reporting threshold) from the captured video stream. In some embodiments, the image or image sequences may correspond to raw image or image sequences corresponding to particular portions (e.g., particular video frames) of the video stream in which the person, object, or event of interest is detected. In other embodiments, the metadata identifying features or characteristics about the detected person, object, or event of interest may be reported separately or along (e.g., as an annotation in the form of audio or text) with the image or image sequences featuring the detected person, object, or event of interest.

The electronic computing device 120 is configured to adjust the amount of video analytics data reported from one or more of the video capturing devices 110 based on incident context (e.g., incident type, location etc.,) associated with a detected incident, in accordance with the embodiments described herein. The functionality of the electronic computing device 120 may be implemented at one or more of the video capturing devices 110 shown in FIG. 1 or alternatively at a remote server (e.g., at a security command center) or a cloud computing system. The electronic computing device 120 and the video capturing devices 110 are communicatively coupled via a communication network 130. The communication network 130 is an electronic communications network including wired and wireless connections. The communication network 130 may be implemented using a combination of one or more networks including, but not limited to, a wide area network, for example, the internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used.

In accordance with some embodiments, the electronic computing device 120 adjusts the amount of video analytics data reported from a video capturing device 110 as a function of a detected incident that has occurred at a given location. In operation, the electronic computing device 120 detects an occurrence of an incident at an incident location based on processing video data or sensor data that are captured corresponding to the incident location. The incident may correspond to a type of public safety incident (e.g., a car accident, a bank robbery, an explosion, a suspect pursuit, a gunshot event, and the like) that is detected based on video stream captured by one or more of the video capturing devices 110 or alternatively based on sensor data captured by one or more sensors that are deployed near an incident scene. The sensors may include, but are not limited to, an audio sensor (e.g., microphone), a video sensor (e.g., camera), infrared sensor, sonar sensor, sensors such as a chemical, biological, radiological, nuclear, or explosive (CBRNE) sensor, biometric sensor, smell sensor, motion sensors (such as light sensor, accelerometer, magnetometer, and/or gyroscope), LoRa (Long Range) sensor devices, radio wave emission and detection sensors (such as radio direction and distancing (RADAR) or sound navigation and ranging (SONAR)) sensors), and light detection and ranging (LiDAR) devices. For example, a video capturing device (e.g., video capturing device 110-1) may be configured with a baseline video analytics data reporting threshold (e.g., requiring reporting of detected vehicles with minimum speed level above 65 miles per hour). In this case, the baseline video analytics data reporting threshold may result in reporting video analytics data corresponding to only those events from the captured video stream in which a vehicle is detected with a speed above 65 miles per hour.

In accordance with embodiments described herein, the electronic computing device 120 determines a new video analytics data reporting threshold (e.g., requiring reporting of detected vehicles with minimum speed level above 45 miles per hour) for reporting video analytics data from one or more identified video capturing devices 110 in response to a specific incident (e.g., a gunshot event) detected by the electronic computing device 120. If the baseline video analytics data reporting threshold of a video capturing device 110 (e.g., video capturing device 110-1 that is identified as being deployed within a predefined distance (e.g., 2 miles) from the incident location) is greater than the new video analytics data reporting threshold, then the electronic computing device 120 transmits an instruction to the identified video capturing device 110 to lower its video analytics data reporting threshold to the new video analytics data reporting threshold (e.g., requiring reporting of detected vehicles with minimum speed level above 45 miles per hour) and further report video analytics data (corresponding to vehicles detected from the video stream captured by the identified video capturing device 110) as a function of the new video analytics data reporting threshold (i.e., requiring reporting of detected vehicles with minimum speed level above 45 miles per hour). In this example, lowering the video analytics data reporting threshold from minimum speed level of 65 miles per hour to minimum speed level of 45 miles per hour may result in a relative increase in the amount of video analytics data (e.g., number of vehicles detected from the captured video stream with speed level of more than 45 miles per hour) being reported from a particular video capturing device 110 in response to the specific incident (e.g., gunshot event). In accordance with some embodiments, the electronic computing device 120 specifies the new video analytics data reporting threshold in the instruction as an absolute threshold value or as a relative threshold value. When an absolute threshold value is specified in the received instruction, the video capturing device 110 receiving the instruction adjusts its video analytics data reporting threshold by either increasing or lowering its video analytics data reporting threshold until the absolute threshold value is reached. For example, if the absolute threshold value is 45 miles per hour, the video capturing device 110 sets its video analytics data reporting threshold to 45 miles per hour, for example by lowering the threshold value of 65 miles per hour to 45 miles per hour. On the other hand, when a relative threshold value is specified in the received instruction, the video capturing device 110 receiving the instruction adjusts its video analytics data reporting threshold by lowering or increasing its video analytics data reporting threshold as a function of the relative threshold value. For example, if the relative threshold value indicates a required reduction of 75 percent in the threshold value, the video capturing device 110 reduces, for instance, currently configured threshold value of 80 miles by 75 percent in order to set a new threshold value of 60 miles per hour for reporting video analytics data from the video stream captured by the video capturing device 110.

In accordance with some embodiments, the electronic computing device 120 may also transmit an instruction to multiple video capturing devices (e.g., video capturing devices 110-1, 110-2, 110-3) that may be deployed in locations that are within a predetermined distance from the incident location. In some embodiments, the instruction to lower video analytics data reporting threshold may be propagated from a video capturing device (e.g., video capturing device 110-1) to one or more other video capturing devices (e.g., video capturing devices 110-2, 110-3) within its communication range, for example, when the one or more other video capturing devices are also determined as being deployed within the predetermined distance from the incident location. In these embodiments, the video analytics data reporting thresholds to be configured may be different for different video capturing devices 110, for example, depending on the relative distance between the respective video capturing devices and the incident location and/or depending on the device capability (e.g., video analytics engine configuration, video capture resolution, bandwidth, storage/buffer capacity, field-of-view, computation efficiency, etc.,) of the respective video capturing devices.

In accordance with some embodiments, the video capturing devices 110 may be temporarily configured with the lowered video analytics data threshold before reverting to a baseline video analytics data reporting threshold or another video analytics data threshold as instructed by the electronic computing device 120. In these embodiments, the electronic computing device 120 may transmit a further instruction to the video capturing device 110 to revert to its baseline video analytics data reporting threshold when the incident returns to a normal status. For example, the electronic computing device 120 may receive an input (e.g., from a security operator monitoring the incident situation) indicating that the incident has returned to the normal status or alternatively the electronic computing device 120 may automatically determine that the incident has returned to normal status based on processing the subsequent video data or sensor data that are captured corresponding to the incident location (e.g., when the video analytics data indicate that the incident severity is low or none).

Figure 2:
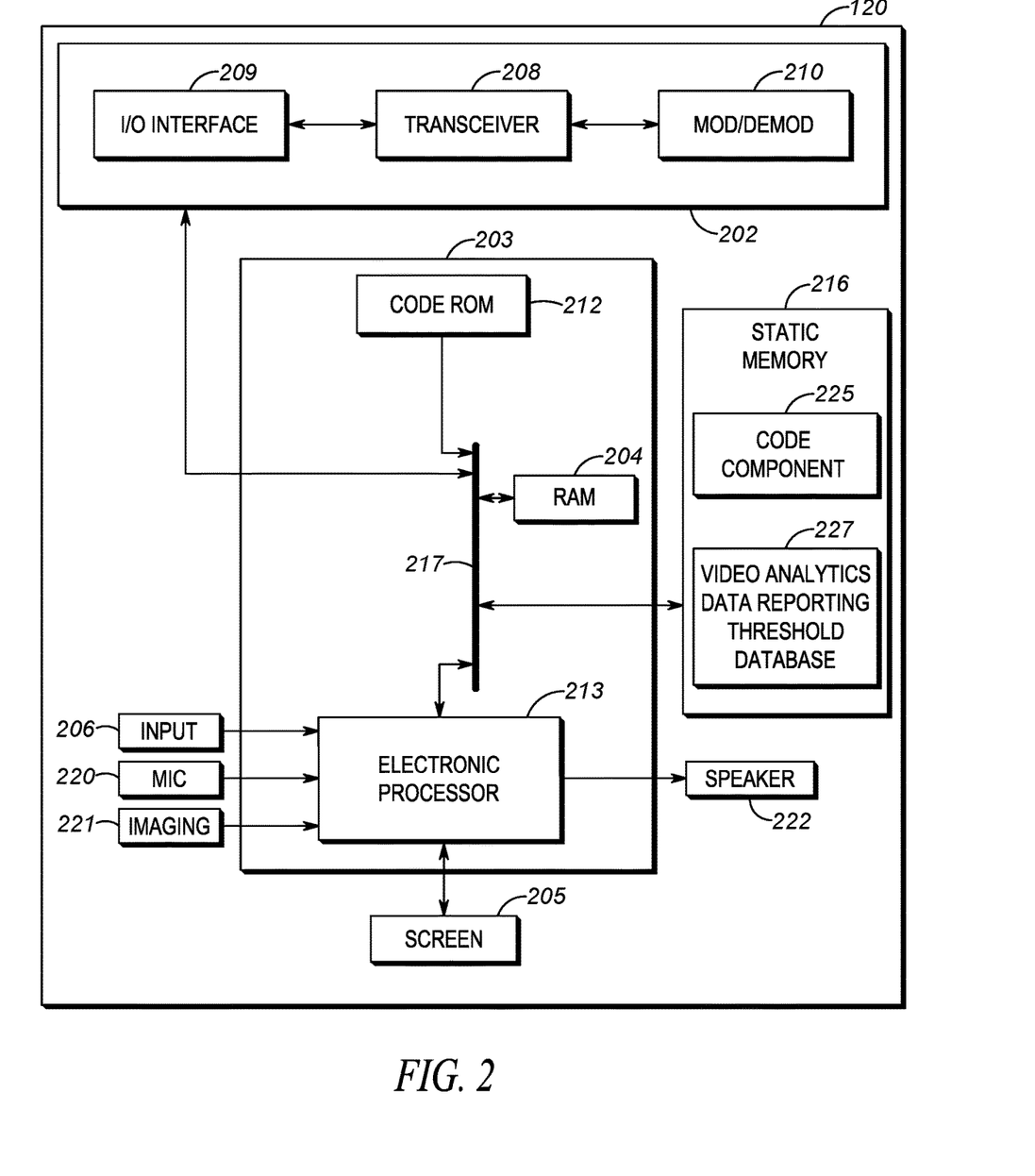
FIG. 2 is a device diagram showing a device structure of an electronic computing device of the system of FIG. 1 in accordance with some embodiments.

Now referring to FIG. 2, a schematic diagram illustrates an electronic computing device 120 according to some embodiments of the present disclosure. The electronic computing device 120 performs the functions of the electronic computing device 120 shown in FIG. 1, and may be embodied in one or more video capturing devices 110, or some other communication device or computing device not illustrated in FIG. 1, and/or may be a distributed computing device across two or more of the foregoing (or multiple of a same type of one of the foregoing) and linked via a wired and/or wireless communication link(s).

While FIG. 2 may represent the devices as described above with respect to FIG. 1, depending on the type of the device, the electronic computing device 120 or other devices may include fewer or additional components in configurations different from that illustrated in FIG. 2. For example, in some embodiments, the electronic computing device 120 acting as an infrastructure controller may not include one or more of the screen 205, microphone 220, imaging device 221, and speaker 222. As another example, in some embodiments, the electronic computing device 120 acting as a communication device (e.g., used by a security operator or a first responder) may include one or more of the screen 205, microphone 220, imaging device, and a speaker 22. As still another example, in some embodiments, the electronic computing device 120 acting as a video capturing device (e.g., surveillance camera mounted on a wall) may include one or more of the imaging device 221 and microphone 220, but may not include the screen, the user interface unit, and the speaker 222. Other combinations are possible as well.

As shown in FIG. 2, the electronic computing device 120 includes a communications unit 202 coupled to a common data and address bus 217 of a processing unit 203. The electronic computing device 120 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

An audio and/or video capture device (microphone 220 and/or imaging device 221) may be implemented at the electronic computing device 120 for capturing audio and/or video data, for example, in embodiments in which the video capturing device 110 and electronic computing device 120 are integrated as single unit. For example, the microphone 220 may be present for capturing audio from a user and/or other environmental or background audio that is further processed by processing unit 203 and/or is transmitted as voice or audio stream data, or as acoustical environment indications, by communications unit 202 to other communication devices in the system 100. The imaging device 221 provides video (still or moving images) of the electronic computing device 120 for further processing by the processing unit 203 and/or for further transmission as a video stream by the communications unit 202. A speaker 222 may be present for reproducing audio that is decoded from voice or audio streams of calls received via the communications unit 202 from other devices, from digital audio stored at the electronic computing device 120, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate, for example, with video capturing devices 110 in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The one or more electronic processors 213 has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In some embodiments, the electronic computing device 120 further includes or has access to video analytics data reporting threshold information that includes different video analytics data reporting thresholds to be configured for reporting video analytics data in response to different type of detected incidents. The video analytics data reporting threshold information may be stored in any data format (e.g., database, file, etc.,) suitable for accessing by the electronic computing device 120. In one embodiment, the video analytics data reporting threshold information is stored at a video analytics data reporting threshold database 227 that may be maintained by the electronic computing device 120 at the static memory 216. The database 227 maps each of a plurality of incident types to a different predetermined video analytics data reporting threshold. For example, the database 227 may map a gunshot incident that is detected within 1 mile of distance (from a particular video capturing device) and further within 15 minutes of time period to a gunshot detector threshold (e.g., a threshold that defines a minimum sensitivity level or confidence level for matching an object or audio pattern detected from the video data to a predefined object or audio pattern associated with the gun object) of 60, while the gunshot incident that is detected within 0.25 miles of distance (from a particular video capturing device) to a gunshot detector threshold of 40. In other embodiments, the electronic computing device 120 may dynamically determine a video analytics data reporting threshold based on the real-time video or sensor data that are captured corresponding to the detected incident. Below are example tables I and II illustrating the thresholds that are determined for different incident types:—

TABLE I

| Detected Incident Type | Gunshot detector threshold (0 . . . 100) |
|---|---|
| Baseline (Default threshold) | 80 |
| Gunshot audio detector trigger within 0.25 mi and 5 min | 40 |
| Gunshot audio detector trigger within 1 mi and 15 min | 60 |
| Unusual crowd detected at night | 70 |
| Fight detected during the day | 65 |
| Fight detected during the night | 50 |
| Person laying on ground detected | 55 |

TABLE II

| Detected Incident Type | Speed anomaly confidence threshold |
|---|---|
| Baseline | 80 |
| Gunshot detected | 50 |
| Fight detected | 70 |
| Person running very fast detected in same camera | 60 |
| Person running very fast detected in nearby camera | 65 |

In examples set forth herein, the electronic computing device 120 is not a generic computing device, but a device specifically configured to implement functionality of adjusting an amount of video analytics data reported by video capturing devices 110 deployed in a given location. For example, in some embodiments, the electronic computing device 120 specifically comprises a computer executable engine configured to implement functionality of adjusting an amount of video analytics data reported by video capturing devices 110 deployed in a given location.

Figure 3:
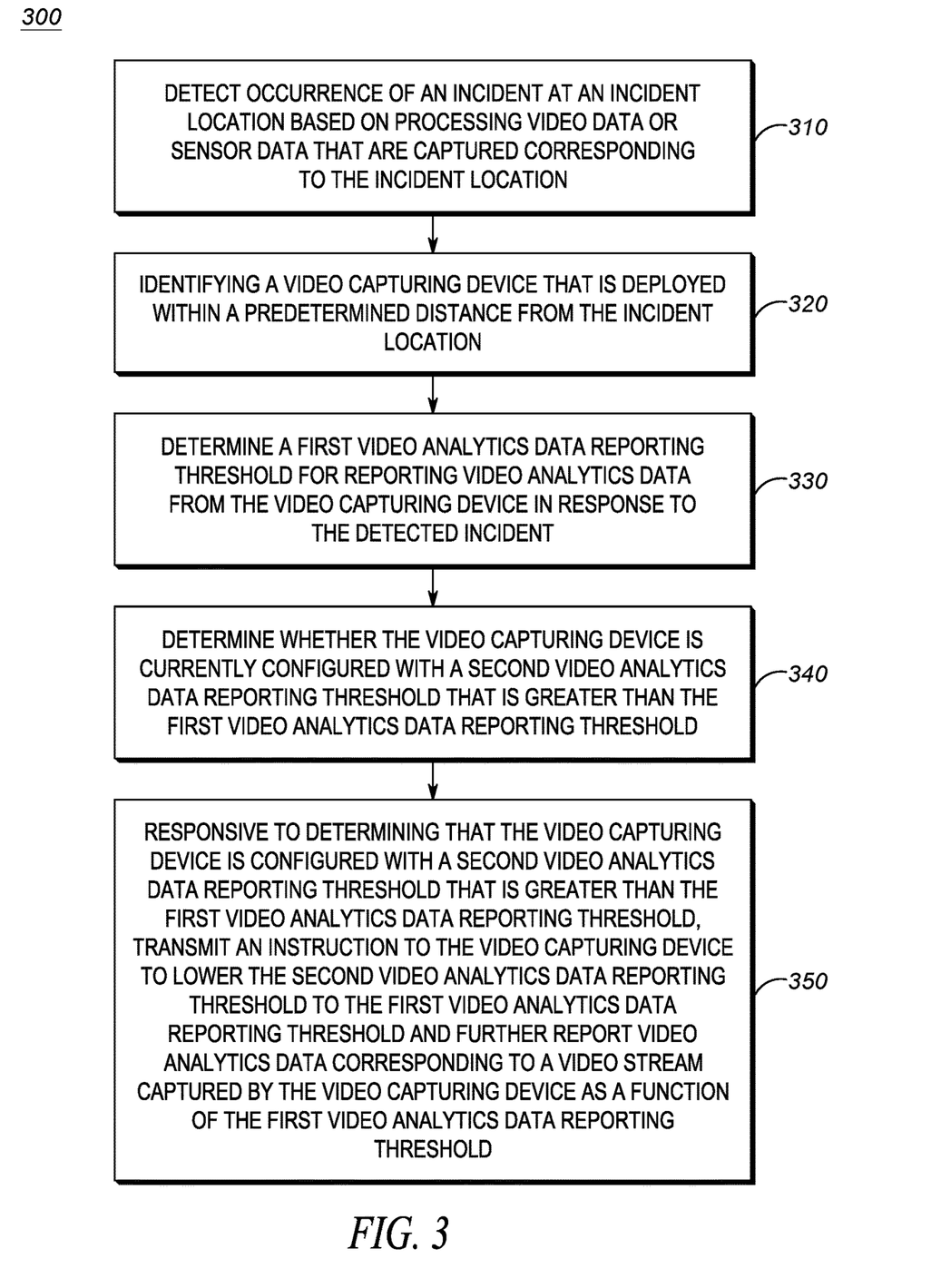
FIG. 3 illustrates a flowchart of a method for adjusting an amount of video analytics data reported by video capturing devices deployed in a given location in accordance with some embodiments.

FIG. 3 illustrates a flow chart diagram of a method 300 of adjusting an amount of video analytics data reported by video capturing devices 110 deployed in a given location. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The method 300 shown in FIG. 3 can be performed by one or more components of the electronic computing device 120, and will be described with reference to the functions and components of the system 100. Some of the features described in the method 300 may be performed using underlying hardware such as an electronic processor 213 implemented at the electronic computing device 120.

At block 310, the electronic computing device 120 detects occurrence of an incident at an incident location based on processing video data or sensor data that are captured corresponding to the incident location. In one embodiment, the electronic computing device 120 may be configured to receive video data (e.g., real-time video stream and/or video metadata) from one or more of the video capturing devices 110 that have a field-of-view of the incident location. The electronic computing device 120 then processes the video data via a video analytics engine associated with the electronic computing device 120 to detect an occurrence of an incident at a particular location relative to the video capturing device 110 from the video data. Additionally, or alternatively, the electronic computing device 120 processes sensor data (e.g., ambient audio, motion data etc.,) captured from one or more sensors deployed near the incident location to detect an occurrence of an incident. The electronic computing device 120 is configured to process the video data and/or sensor data to determine a type of incident (e.g., a gunshot, an explosion, a fire incident, a theft, a medical emergency, a suspected drug infraction, a vehicle collision, etc.) based on one or more features of person, object, or event extracted from the video data or the sensor data. The incident location may be a location of a video capturing device 110 and/or sensor that reported the video data/sensor data based on which the occurrence of the incident was detected. The incident location may be detected via a global positioning system (GPS) or triangulation method, or other technical locationing solution implemented at the electronic computing device 120. In other embodiments, the electronic computing device 120 detects an occurrence of an incident at a given location based on incident information (e.g., incident identifier, incident type, incident severity, incident location, etc.,) received from a dispatcher (e.g., a computer aided dispatch (CAD) server).

Next, at block 320, the electronic computing device 120 identifies a video capturing device 110 (e.g., video capturing device 110-1) that is deployed within a predetermined distance from the incident location. The video capturing device 110 identified at block 320 is also interchangeably referred herein as "identified video capturing device 110." The identified video capturing device 110 may be same or different than the video capturing device 110 from which the video data was obtained for the purpose of detecting an occurrence of the incident. In one embodiment, the electronic computing device 120 may identify a plurality of video capturing devices (e.g., video capturing devices 110-1, 110-2, 110-3) that are deployed within the predetermined distance from the incident location. In this embodiment, the electronic computing device 120 separately performs the functionality described with reference to blocks 330-350 for each of the identified video capturing devices 110. The predetermined distance may be identified based on user input or alternatively automatically determined by the electronic computing device 120 based on parameters such as incident type, incident location, and location of the video capturing device 110. The predetermined distance may vary depending on the incident context. As an example, the electronic computing device 120 may identify a video capturing device 110 that is deployed within 2 miles of radius from a location at which an incident such as a gunshot event was detected. As another example, if the type of incident is detected as a suspect pursuit, the electronic computing device 120 may identify one or more video capturing devices 110 that are deployed (e.g., at intersections along a pursuit direction) within 5 miles of the incident location. In accordance with some embodiments, when the electronic computing device 120 and the identified video capturing device 110 are integrated as a single unit, the electronic device 120/identified video capturing device 110 can locally determine a current location of the unit and further determine whether the current location of the unit is within the predetermined distance for the purpose of determining whether to adjust video analytics data reporting threshold currently configured at the identified video capturing device 110.

In some embodiments, the distance between the incident location and the video capturing device may be measured in terms of a number of node hops (instead of actual distance) between the video capturing device and another device (e.g., another video capturing device) initially reporting the occurrence of the incident. For example, if the video capturing devices 110 are operating as an ad-hoc network, a first video capturing device in the network may report the occurrence of an incident to a second video capturing device via other intermediate video capturing devices. In this case, the number of node hops are determined based on the number of intermediate video capturing devices between the first video capturing device and the second video capturing device. As an instance, when the predetermined distance is set to a maximum of three node hops, the electronic computing device 120 may select only those video capturing devices (for the purpose of adjusting video analytics data reporting threshold) that are reachable from the reporting video capturing device by a maximum of three node hops.

After a video capturing device 110 is identified at block 320, the electronic computing device 120 proceeds to block 330 to determine a first video analytics data reporting threshold for reporting video analytics data from the identified video capturing device 110 in response to the detected incident. In one embodiment, the electronic computing device 120 determines a first video analytics data reporting threshold based on incident context (e.g., type of detected incident) and also the specific type of video analytics data to be reported. For example, when the type of incident corresponds to a gunshot event and the type of video analytics data to be reported corresponds to vehicles of interest, the electronic computing device 120 may determine a first video analytics data reporting threshold that corresponds to reporting detected vehicles with speed level above 45 miles per hour. In one embodiment, the electronic computing device 120 may determine the first video analytics data reporting threshold by selecting, from the video analytics data reporting threshold database 227, an appropriate threshold that is mapped corresponding to the specific type of incident and specific type of video analytics data. In accordance with some embodiments, the electronic computing device 120 dynamically (i.e., based on real-time detection of incident) determines the first video analytics data reporting threshold using algorithms (e.g., machine learning algorithms) that take into account various parameters such as incident type, incident severity, time of occurrence of the incident, time since the incident was detected, type of video analytics data to be reported, location of the identified video capturing device 110, distance between the incident location and the identified video capturing device 110, device capability of the identified video capturing device 110, thresholds (e.g., previous threshold values received via user input or automatically determined by the electronic computing device 120) configured for historical incidents associated with same or similar incident context, and other real-time information (e.g., number of suspects, type of detected weapons, type of vehicles, crowd behavior etc.,) obtained in relation to the detected incident.

Next, at block 340, the electronic computing device 120 determines whether a second video analytics data reporting threshold currently configured at the identified video capturing device 110 is greater than the first video analytics data reporting threshold determined at block 330. The video analytics data reporting threshold that is currently configured at a particular video capturing device 110 may correspond to a baseline video analytics data reporting threshold or alternatively another video analytics data reporting threshold that is greater than or lower than the baseline video analytics data reporting threshold. In one embodiment, the electronic computing device 120 has access to video analytics data reporting thresholds (e.g., corresponding to each of the specific types of video analytics data to be reported) that are respectively configured at the video capturing devices 110. For example, the electronic computing device 120 may send a request to the identified video capturing device 110 to provide information related to the video analytics data reporting threshold that is currently configured at the identified video capturing device 110, and further obtains information related to the video analytics data reporting threshold currently configured at the identified video capturing device 110 from the identified video capturing device 110 in response to the request. In this embodiment, the electronic computing device 120 compares the first video analytics data reporting threshold (determined at block 330) with the second video analytics data reporting threshold that is currently configured at the identified video capturing device 110. When the second video analytics data reporting threshold that is currently configured at the identified video capturing device 110 is already equal to or below the first video analytics reporting threshold, the electronic computing device 120 may refrain from transmitting an instruction to the identified video capturing device 110 to lower the video analytics data reporting threshold currently configured at the identified video capturing device 110. In this case, the identified video capturing device 110 continues to report video analytics data as a function of the second video analytics data reporting threshold that is currently configured at the identified video capturing device 110, unless the electronic computing device 120 detects a change in the incident context (or the incident detected at block 310 has been updated to correspond to a new type of incident or new severity level) and/or a different type of video analytics data (to be reported from the identified video capturing device 110) for which a video analytics data reporting threshold currently configured at the identified video capturing device 110 is to be updated (e.g., with a lower threshold for reporting video analytics data of a particular type in response to change in the incident context).

On the other hand, when the electronic computing device 120, based on a comparison between the first video analytics data reporting threshold and second video analytics data reporting threshold, determines that the identified video capturing device 110 is currently configured with a second video analytics data reporting threshold that is greater than the first video analytics data reporting threshold determined at block 330, the electronic computing device 120 proceeds to block 350 to transmit an instruction to the identified video capturing device 110 to lower the second video analytics data reporting threshold (currently configured at the identified video capturing device 110) to the first video analytics data reporting threshold and further report video analytics data corresponding to a video stream captured by the identified video capturing device 110 as a function of the first video analytics data reporting threshold. In accordance with some embodiments, the electronic computing device 120 may transmit the instruction to the identified video capturing device 110 via a wired or wireless communication link associated with the communication network 130. When the electronic computing device 120 and the identified video capturing device 110 are integrated as a single device, the electronic computing device 120 may transmit an instruction to locally trigger the configuration of the first video analytics data reporting threshold at the identified video capturing device 110. In response to the instruction received from the electronic computing device 120, the identified video capturing device 110 configures the first video analytics data reporting threshold and further reports video analytics data corresponding to a video stream captured by the identified video capturing device 110 as a function of the first video analytics data reporting threshold.

In accordance with some embodiments, the video capturing device 110 captures the video stream corresponding to a field-of-view and further processes the video stream via an associated video analytics engine. When an instruction to lower the video analytics data reporting threshold is received from the electronic computing device 120, the video capturing device 110 configures the associated video analytics engine with the updated threshold i.e., first video analytics data reporting threshold as included in the instruction received from the electronic computing device 120. The video analytics engine associated with the video capturing device 110 then starts (i.e., responsive to being configured with the updated threshold) processing the video stream captured by the video camera to extract video analytics features and further reports only a subset of video analytics data, i.e., particular set of video analytics features with data points (also referred to as video analytics data points) that specifically meet the threshold requirements of the first video analytics data reporting threshold. As an example, the video analytics engine extracts video analytics data including a first video analytics data point corresponding to a first person, object, or event of interest detected from a first video segment of the processed video stream and similarly a second video analytics data point corresponding to a second person, object, or event of interest detected from a second video segment of the processed video stream. In this example, assume the first video analytics data point is greater than the first video analytics data reporting threshold (determined at block 330) and the second video analytics data point is lower than the second video analytics data reporting threshold (i.e., configured at the identified video capturing device 110 prior to receiving the instruction at block 350) and greater than the first video analytics data reporting threshold. Further assume that the first video analytics data point includes a confidence level of 70% (e.g., similarity between facial features of a person detected in the video segment and facial features of a person of interest) and the second video analytics data point includes a confidence level of 50% (e.g., similarity between facial features of a person detected in the video segment and facial features of a person of interest), while the second video analytics data reporting threshold corresponds to a baseline confidence level of 65% and the first video analytics data reporting threshold corresponds to a baseline confidence level of 45% (e.g., baseline confidence level indicating the minimum confidence level with which a person needs to be detected from the video stream for the purpose the reporting the detected person as the person of interest). In this example, prior to receiving the instruction transmitted by the electronic computing device 120 to lower the threshold, the identified video capturing device 110 processes the video analytics data extracted from the captured video stream as a function of the second video analytics data reporting threshold. Accordingly, the video capturing device 110 determines that the first video analytics data point (i.e., with a detected confidence level of 70%) is greater than the second video analytics data reporting threshold (i.e., with a baseline confidence level of 65%) and responsively reports the first video analytics data point (i.e., the detected person of interest), and further the video capturing device 110 determines that the second video analytics data point (i.e., with a detected confidence level of 50%) is lower than the second video analytics reporting threshold (i.e. with a baseline confidence level of 65%) and responsively refrains from reporting the second video analytics data point. On the other hand, responsive to receiving the instruction transmitted by the electronic computing device 120 to lower the threshold and further configuring the video analytics engine with the lowered threshold (i.e., first video analytics data reporting threshold), the identified video capturing device 110 processes the video analytics data extracted from a captured stream as a function of the lowered threshold (i.e., first video analytics data reporting threshold). Accordingly, in this case, the video capturing device 110 may report both the first video analytics data point (i.e. with a detected confidence level of 70%) and the second video analytics data point (i.e., with a detected confidence level of 50%) when both the first video analytics data point and second video analytics data point are greater than the minimum confidence level of 45% associated with the lowered threshold. In accordance with some embodiments, the video capturing devices 110 may report video analytics data corresponding to person, object, or event of interest that are detected based on the lowered video analytics data reporting threshold, using different visual schemes. For example, video analytics data that are reported due to a lowered threshold may be highlighted in a first color scheme (e.g., in red), while video analytics data that are reported due to a baseline threshold may be highlighted in a second color scheme (e.g., in blue). As another example, video analytics data that are reported due to the lowered threshold may be transmitted to a first audio or display device (e.g., for monitoring by a first security operator), while video analytics data that are reported due to the baseline threshold may be transmitted to a second audio or display device (e.g., for monitoring by a second security operator).

In accordance with some embodiments, the video stream on which the first video analytics data reporting threshold is applied for reporting video analytics data corresponds to a video stream captured by the identified video capturing device 110 for a predefined time duration corresponding to one or more of: (i) prior to detecting the occurrence of the incident (i.e., historical video data), (ii) during detecting the occurrence of the incident, and (ii) after detecting the occurrence of the incident. In other words, the identified video capturing device 110 may apply the new threshold (i.e., first video analytics data reporting threshold) to not only those video segments of the video stream that are captured by the video capturing device 110 after the instruction has been received from the electronic computing but also to video segments (e.g., metadata or video analytics data points extracted from previously captured video segments) of video streams that are captured prior to occurrence of the incident and/or in real-time to the occurrence of the incident. For example, if the incident was detected at 2.00 PM in the afternoon and the identified video capturing device 110 received an instruction from the electronic computing device 120 to configure a new threshold (i.e., first video analytics data reporting threshold), then the video computing device may apply the new threshold to stored video segments (e.g., video segments of video streams captured between 1.30 PM to 1.55 PM) that are captured prior to 2.00 PM. In this case, it is possible that the identified video capturing device 110 may identify and report video analytics data (e.g., corresponding to a particular person, object or event detected from the video segments captured prior to the incident) that were previously not reported. The video stream time duration information (i.e., a time duration relative to a time at which the incident was detected) for which video analytics data is to be reported by the identified video capturing device 110 may be included in the instruction transmitted by the electronic computing device 120 at block 350. Additionally, or alternatively, the electronic computing device 120 may also transmit an indication of an expiration time i.e., a time period during which the first video analytics data reporting threshold is to be configured at the identified video capturing device 110 before reverting to the previously configured video analytics data reporting threshold. For example, if the incident was detected at 2.00 PM in the afternoon and the video capturing device 110 received an instruction from the electronic computing device 120 to configure a new threshold (i.e., first video analytics data reporting threshold) with an expiration time of 2.30 PM for the new threshold, then the video computing device may apply the new threshold to only video segments of the video stream that are captured until 2.30 PM. The indication of the expiration time may be transmitted separately or along with the instruction transmitted to the video capturing device 110 (at block 350) to lower the video analytics data reporting threshold. In another embodiment, the electronic computing device 120 may periodically monitor the status of the incident, for example, based on real-time video stream captured by one or more of the video capturing devices and/or sensor data obtained from sensors deployed at the incident location. When the electronic computing device 120 detects that (or otherwise receives an indication from a dispatcher) the incident location has returned to its normal status, the electronic computing device 120 may transmit a further instruction to the identified video capturing device 110 to revert to a baseline or previously configured video analytics data reporting threshold (e.g., second video analytics data reporting threshold).

In case additional video capturing devices 110 are identified at block 320 as being deployed within a predetermined distance from the incident location, the electronic computing device 120 performs the functionality described with reference to blocks 330-350 for each of the additional video capturing devices 110. In this case, the electronic computing device 120 may transmit an instruction to lower video analytics data reporting threshold for each of the additional video capturing devices 110 based on whether a new video analytics data reporting threshold (respectively determined at block 330 for each of the additional video capturing devices 110) is lower than the video analytics data reporting threshold currently configured at the respective video capturing devices. In accordance with some embodiments, the new video analytics data reporting threshold (respectively determined at block 330 for each of the video capturing devices 110 identified at block 320) may be different for different video capturing devices. For example, a video analytics data reporting threshold (e.g., gun detector threshold of 40) that is determined for a first video capturing device (e.g., video capturing device 110-1) that is located between 0 to 0.25 miles of an incident location (e.g., a location at which an unauthorized person carrying gun was detected) may be lower than a video analytics data reporting threshold (e.g., gun detector threshold of 60) that is determined for a second video capturing device (e.g., video capturing device 110-2) that is located within 0.25 miles to 0.75 miles of an incident location corresponding to the same incident. While this example illustrates that the second video capturing device is located farther away from the incident location and therefore has higher video analytics data reporting threshold than the first video capturing device, it is possible that the second video capturing device may be instructed to lower the video analytics data reporting threshold (e.g., from gun detector threshold of 60 to gun detector threshold of 40) at a future point in time, for example, when there is a change in the status of the incident resulting in an incident location (e.g., determined based on the movement direction of the suspect) being updated to a location that is nearer (e.g., 0 to 0.25 miles) to the second video capturing device. Similarly, in this case, the first video capturing device may be instructed to increase the video analytics data reporting threshold (e.g., from gun detector threshold of 40 to gun detector threshold of 60) when the new incident location is farther away (e.g., 0 to 0.75 miles) from the first video capturing device. Further, the video analytics data reporting threshold may be different for different type of video analytics data to be reported from any given video capturing device. For example, the video analytics data reporting threshold for a first type of video analytics data (e.g., for reporting a person of interest detected from the video stream) to be configured at a given video capturing device 110 may correspond to a baseline confidence level of 80% (e.g. for reporting a person captured in the video stream with similar facial features as the person of interest). On the other hand, the video analytics data reporting threshold for a second type of video analytics data (e.g., for reporting a weapon detected from the video stream) to be configured at a given video capturing device may correspond to a baseline confidence level of 50% (e.g., for reporting a weapon detected from the video stream with similar features as a weapon of interest). In accordance with some embodiments, the video analytics data reporting threshold may also correspond to weighted average of baseline confidence levels or qualifying metrics associated with two or more types of video analytics data. For example, the video analytics data reporting threshold may be determined to correspond to a baseline confidence level of 70%, by averaging the minimum confidence levels required for detection of person of interest and also detection of weapon of interest.

In accordance with some embodiments, the instruction transmitted by the electronic computing device 120 at block 350 further includes a request for the identified video capturing device 110 to forward video analytics data reporting threshold to one or more other video capturing devices 110 that are within a communication range of the identified video capturing device 110. The request may further include a condition that the video analytics data reporting threshold is forwarded to only those video capturing devices that are deployed within a predetermined distance from the incident location or alternatively to only those video capturing devices that has the video analytics engine resources or device capability for detecting and reporting video analytics data as a function of the lowered threshold. The video capturing device 110 that received the instruction to configure the first video analytics data reporting threshold (i.e., lowered threshold) may repeat the functions described with reference to blocks 330-350 to identify one or more other video capturing devices that need to be configured with a new video analytics data reporting threshold. The new video analytics data reporting threshold respectively determined for each of the other video capturing devices 110 may be same or different from the first video analytics data reporting threshold configured by the identified video capturing device 110 in response to the instruction transmitted by the electronic computing device 120 at block 350. An electronic computing device 120 residing at or associated with the video capturing device 110 may determine a different video analytics data reporting threshold for each of the other identified video capturing devices depending on relative distance between the respective video capturing devices and the incident location and/or device capability (e.g., video analytics engine configuration, video capture resolution, bandwidth, storage/buffer capacity, field-of-view, computation efficiency, etc.,) of the respective video capturing devices. For example, a first video capturing device 110-1 may receive an instruction from the electronic computing device 120 to configure a gun detector threshold of 40 and in response, the first video capturing device 110-1 may locally configure the gun detector threshold to 40 and further in response, may determine a gun detector threshold of 60 for a second video capturing device 110-2 that may be located further away from the detected incident. In this example, the first video capturing device 110-1 may transmit an instruction to the second video capturing device 110-2 to lower the gun detector threshold to 60 only when a baseline gun detector threshold or current gun detector threshold configured at the second video capturing device 110-2 is greater than the gun detector threshold of 60. Otherwise, when the baseline gun detector threshold or current gun detector threshold configured at the second video capturing device 110-2 is already lower than the gun detector threshold of 60 (as determined at the first video capturing device 110-1), the first video capturing device 110-1 refrains from instructing the second video capturing device 110-2 to lower the gun detector threshold.

In accordance with some embodiments, the electronic computing device 120 continues to monitor the status of the detected incident by processing an updated video data or updated sensor data that are captured corresponding to the incident location during a time duration after the occurrence of the incident. If the status of the incident indicates that there is a change in the incident context (e.g., from a fight incident to a gunshot incident) based on the updated video data or sensor data, the electronic computing device 120 determines an updated video analytics data reporting threshold based on the change in the incident context. If the updated video analytic data reporting threshold is lower than a previously lowered video analytics data configured (i.e., first video analytics data reporting threshold) at an identified video capturing device 110, the electronic computing device 120 transmits a further instruction to the identified video capturing device 110 to lower the first video analytics data reporting threshold configured at the identified video capturing device 110 to the updated video analytics data reporting threshold (i.e., threshold determined in response to the change in the incident status) and further report video analytics data corresponding to a video stream captured by the video capturing device 110 as a function of the updated video analytics data reporting threshold.

In accordance with some embodiments, the electronic computing device 120 may control allocation of computation resources (e.g., classifiers) to the identified video capturing device 110. For example, the electronic computing device 120 may direct allocation of more computation resources to a first video capturing device 110-1 over a second video capturing device 110-2 if it is determined that the amount of video analytics data required to be reported from the first video capturing device 110-1 is more than the second video capturing device 110-2. In this case, the electronic computing device 120 not only transmits an instruction to the first video capturing device 110-1 to lower the video analytics data reporting threshold (in order to increase the amount of video analytics to be reported) but also controls the allocation of the computation resources (e.g., video analytics engine software and/or hardware resources) to enable the first video capturing device 110-1 to perform computationally intensive processing of captured video streams to detect and report video analytics data that meet the requirements of the lowered video analytics data reporting threshold.

In accordance with some embodiments, the electronic computing device 120 may transmit an instruction to an identified video capturing device 110 to increase its video analytics data reporting threshold to a new video analytics data reporting threshold (i.e., a first video analytics data reporting threshold as determined at block 330 of FIG. 3) when a baseline video analytics data reporting threshold or a currently configured video analytics data reporting threshold is lower than the new video analytics data reporting threshold that is determined based on an occurrence of an incident (e.g., security breach) relative to a location of the identified video capturing device 110. As an example, prior to the reporting of any security breach, the video capturing device 110 may be configured to report video analytics data according to a baseline confidence video analytics reporting threshold that may include, for example, a baseline confidence level set to require a 50% match in facial features between a person detected in the video stream captured by the identified video capturing device and a person of interest. In this example, after the security breach has been reported, the electronic computing device may determine a new video analytics data reporting threshold that may include, for example, a baseline confidence level set to require a 90% match in facial features between a person detected in the video stream captured by the identified video capturing device and a person of interest. In these embodiments, increasing video analytics data reporting threshold (i.e., from a baseline confidence level of 50% match in facial features to a baseline confidence level of 90% match in facial features) may relatively decrease the number of persons, objects, or event of interest that may be detected from the video stream captured by the identified video capturing device 110. The increase in video analytics data reporting threshold may further make the face recognition process more stringent, thereby improving the accuracy of video analytics data that is required in some situations such as when there is a security breach in an area and further there is a need to restrict the person causing the security breach from accessing other secured areas.

FIGS. 4A-4E show a camera grid geometry to illustrate an example of application of the embodiments described herein. In FIGS. 4A-4E, each individual cell represents a video camera 410 that is associated with a video capturing device 110 shown in FIG. 1. The grid is representative of a spatial relationship between the video cameras 410. For example, the cells adjacent to each other represent video cameras 410 that are deployed in proximity to each other. On the other hand, the cells that are located far from each other represent video cameras 410 that are deployed far from each other. For example, the video camera 410-1 is deployed far from video camera 410-n. Further, video cameras 410-1 and 410-n may not be in direct communication range of each other. The video cameras 410-1 through 410-n capture video stream of their respective field-of-views and further an electronic computing device (e.g., electronic computing device 120) that is integrated at or otherwise associated with the respective video cameras 410-1 through 410-n processes the video streams respectively captured by the video cameras 410-1 through 410-n to detect occurrence of an incident at locations in which the respective video cameras 410-1 through 410-n are deployed. In accordance with embodiments, the video cameras 410 propagate lowered video analytics data reporting thresholds to other video cameras 410 in response to detecting occurrence of an incident at an incident location.

Figure 4A:
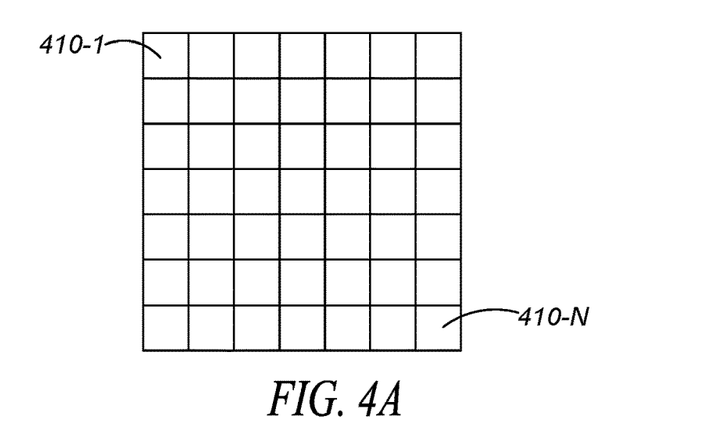
FIGS. 4A-4F show a camera grid geometry to illustrate an example of application of the embodiments described herein.
Figure 4B:
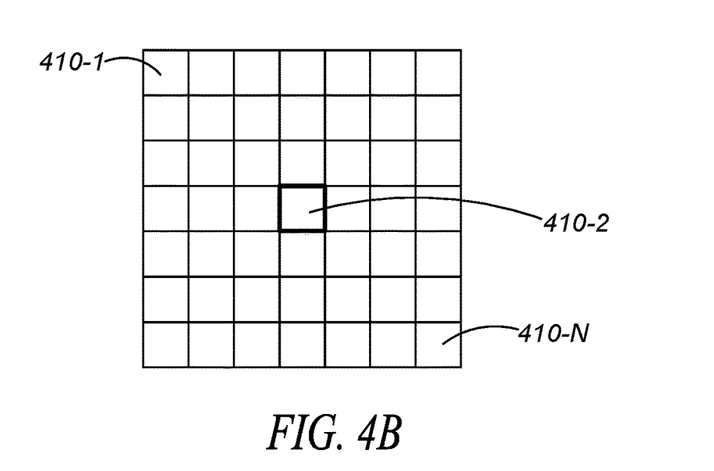
Figure 4C:
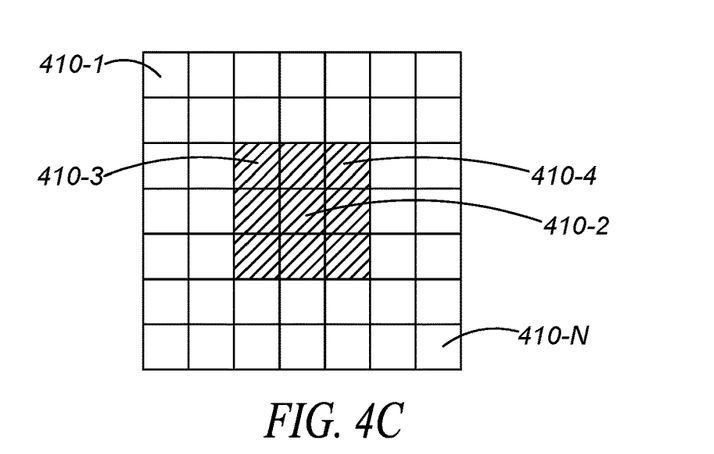

FIGS. 4A-4F show snapshot of the different video cameras 410 at different points in time. For example, FIG. 4A represents a time snapshot when no incident (e.g., a public safety incident) was detected in the locations relative to which the video cameras 410 are deployed. For example, the grid pattern shown in FIG. 4A indicates that there are no active incidents captured at any of the video cameras 410-1 through 410-n. FIG. 4B represents a time snapshot when an incident was detected from a video stream captured by a particular video camera 410-2. In the example shown in FIG. 4B, the cell corresponding to the video camera 410-2 is highlighted to show that an incident (e.g., a gunshot event) was detected by an electronic computing device 120 based on the video stream captured by the video camera 410-2. In accordance with embodiments described herein, the electronic computing device 120 may trigger a gunshot event alert to other video cameras 410 in proximity in response to detecting the gunshot event at the video camera 410-2. Triggering the gunshot alert includes determining a new video analytics data reporting threshold for video cameras 410 that are identified as being deployed within a predetermined distance from the incident location. As shown in FIG. 4C, the gunshot event alert with an instruction to lower the video analytics data reporting threshold is propagated to video cameras (e.g., video cameras 410-3, 410-4) surrounding the incident location (i.e., a location corresponding to video camera 410-2). A subset of video cameras including video cameras 410-3 and 410-4 surrounding the video camera 410-2 is highlighted in FIG. 4C to show video cameras 410 at which the gunshot event alert was propagated (i.e., transmitted from an electronic computing device 120 associated with the video camera 410-2) in order to enable video cameras such as 410-3 and 410-4 to report video analytics data as a function of the lowered video analytics data threshold. Lowering video analytics data threshold allow the video cameras 410 to operate at a heightened sensitivity level. Further, the amount of video analytics data reported by video cameras such as 410-3 and 410-4 with lowered video analytics data threshold may relatively increase due to the lowered threshold. For example, the lowered threshold may minimize the baseline confidence level associated with detecting the person, object, or event of interest from the video stream, and therefore may increase the number of persons, objects, or events that may be detected and further reported from video cameras such as 410-3 and 410-4.

Figure 4D:
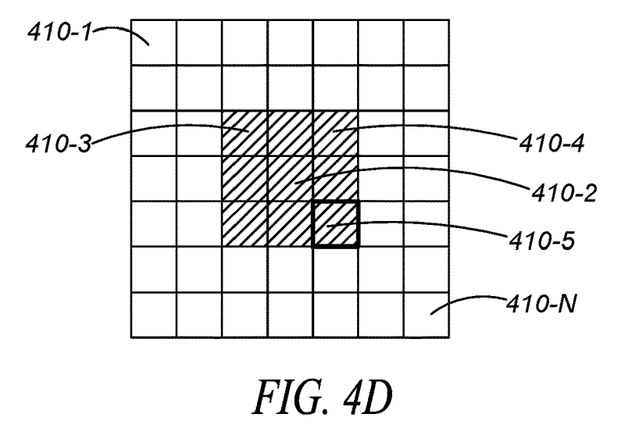
Figure 4E:
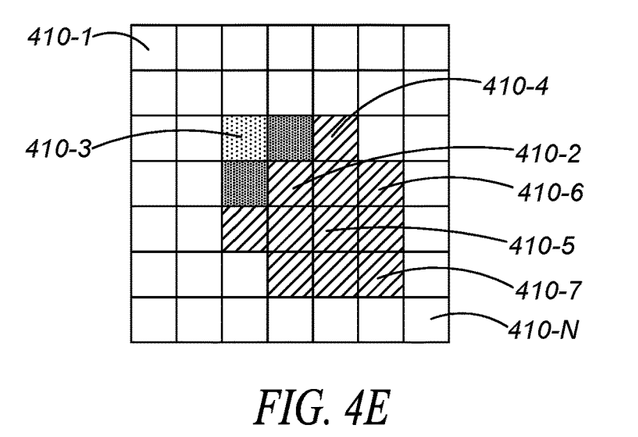
Figure 4F:
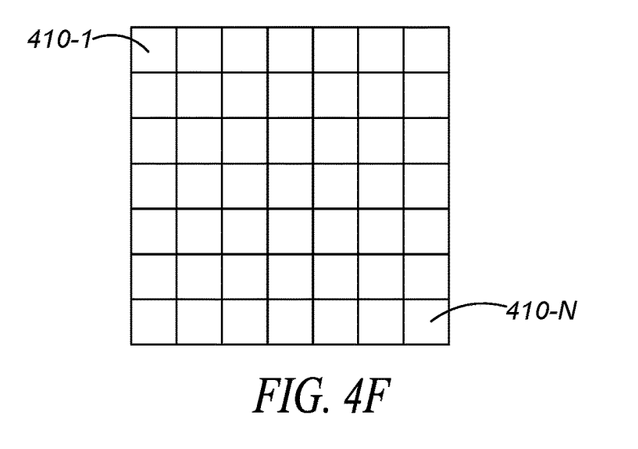

In FIG. 4D, a cell corresponding to a video camera 410-5 is highlighted to show detection of a new incident (e.g., pursuit of a suspect associated with the gunshot event) from a video stream captured corresponding to a field-of-view of the video camera 410-5. In response to detecting the new incident at a location corresponding to the video camera 410-5, the electronic computing device 120 may further propagate an alert with lowered video analytics data reporting threshold to one or more other video cameras relative to the location of the video camera 410-5. As shown in FIG. 4E, the cells corresponding to video cameras 410-6 and 410-7 are similarly patterned (with stripe pattern) to indicate that the video cameras 410-6 and 410-7 start operating with lowered video analytics data reporting threshold in response to the new incident detected at video camera 410-5. In FIG. 4E, cells corresponding to some video cameras (e.g., video camera 410-3) are shown with a different pattern (with dotted pattern) to indicate that these video cameras have reverted to a higher video analytics data reporting threshold (e.g., a baseline video analytics data reporting threshold or another threshold which is higher than the lowered video analytics data reporting threshold configured at video cameras such as 410-2, 410-5). For example, the instruction to revert to a baseline or previous video analytics data reporting threshold may be provided to a particular video camera when the incident location returns to its normal status. When the incident location completely returns to its normal status, all the video cameras 410-1 through 410-n may revert to its baseline video analytics data reporting threshold. The time snapshot shown in FIG. 4F indicates that all the video cameras 410-1 through 410-n are operating with normal sensitivity after the incident location has returned to its normal status.

While the embodiments described above are directed towards adjusting an amount of video analytics data reported by video capturing devices, the principles disclosed herein can be similarly applied to adjust sensor analytics data reported by sensor devices other than a video capturing device. Such sensor devices may include, but are not limited to, an audio sensor (e.g., microphone), infrared sensor, sensors such as a chemical, biological, radiological, nuclear, or explosive (CBRNE) sensor, biometric sensor, smell sensor, motion sensors (such as light sensor, accelerometer, magnetometer, and/or gyroscope), LoRa (Long Range) sensor devices, radio wave emission and detection sensors (such as radio direction and distancing (RADAR) or sound navigation and ranging (SONAR)) sensors), and light detection and ranging (LiDAR) devices. For example, the electronic computing device 120 shown in FIG. 1 is configured to determine a new sensor analytics data reporting threshold for reporting sensor analytics data from one or more identified sensor devices in response to a specific incident. In this example, when a baseline sensor analytics data reporting threshold of an identified sensor device is greater than the new sensor analytics data reporting threshold, the electronic computing device 120 transmits an instruction to the identified sensor device to lower its sensor analytics data reporting threshold to the new sensor analytics data reporting threshold. Temporarily lowering sensor analytics data reporting threshold in response to an incident may relatively increase the amount of sensor data reported by sensor devices, and the reported sensor data may be helpful to security operators for identifying other events that may be potentially relevant to the detected incident.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adjusting an amount of video analytics data reported by video capturing devices deployed in a given location, the method comprising:
   detecting, at an electronic computing device, occurrence of an incident at an incident location based on processing video data or sensor data that are captured corresponding to the incident location;
   identifying, at the electronic computing device, a video capturing device that is deployed within a predetermined distance from the incident location;
   determining, at the electronic computing device, a first video analytics data reporting threshold for reporting video analytics data from the video capturing device in response to the detected incident;
   determining, at the electronic computing device, whether the video capturing device is currently configured with a second video analytics data reporting threshold that is greater than the first video analytics data reporting threshold; and
   responsive to determining that the video capturing device is currently configured with a second video analytics data reporting threshold that is greater than the first video analytics data reporting threshold, transmitting, at the electronic computing device, an instruction to the video capturing device to lower the second video analytics data reporting threshold to the first video analytics data reporting threshold and further report video analytics data corresponding to a video stream captured by the video capturing device as a function of the first video analytics data reporting threshold.

2. The method of claim 1, further comprising:
   identifying at least one other video capturing device that is deployed within the predetermined distance from the incident location; and determining a third video analytics data reporting threshold for reporting video analytics data from the at least one other video capturing device in response to the detected incident;

determining, at the electronic computing device, whether the at least one other video capturing device is currently configured with a fourth video analytics data reporting threshold that is greater than the third video analytics data reporting threshold; and responsive to determining that the at least one other video capturing device is currently configured with a fourth video analytics data reporting threshold that is greater than the third video analytics data reporting threshold, transmitting, at the electronic computing device, an instruction to the at least one other video capturing device to lower the fourth video analytics data reporting threshold to the third video analytics data reporting threshold and further report video analytics data corresponding to a video stream captured by the at least one other video capturing device as a function of the third video analytics data reporting threshold.

3. The method of claim 2, wherein the first video analytics data reporting threshold determined for the video capturing device is lower than the third video analytics data reporting threshold determined for the at least one other video capturing device when the first video analytics data reporting threshold and third video analytics data reporting threshold are defined for reporting same type of video analytics data and further when a first distance between the video capturing device and the incident location is lower than a second distance between the at least one other video capturing device and the incident location.

4. The method of claim 1, further comprising:
responsive to determining that the video capturing device is currently configured with a second video analytics data reporting threshold that is not greater than the first video analytics data reporting threshold, refraining from transmitting an instruction to the video capturing device to lower the second video analytics data reporting threshold that is currently configured at the video capturing device.

5. The method of claim 1, wherein responsive to transmitting the instruction to the video capturing device, the method comprising:
causing the video capturing device to report only a subset of the video analytics data extracted from video stream captured by the video capturing device, wherein the subset of the video analytics data is associated with video analytics data points that are greater than the first video analytics data reporting threshold.

6. The method of claim 5, wherein causing the video capturing device to report only a subset of the video analytics data comprises:
causing the video capturing device to play back an indication of a visual or audio alert corresponding to the subset of the video analytics data via a corresponding display or audio output device communicatively coupled to the video capturing device.

7. The method of claim 1, wherein video analytics data includes a first video analytics data point corresponding to a first person, object, or event of interest detected from a first video segment of the video stream and a second video analytics data point corresponding to a second person, object, or event of interest detected from a second video segment of the video stream, further wherein the first video analytics data point is greater than the first video analytics data reporting threshold and the second video analytics data point is lower than the second video analytics data reporting threshold and greater than the first video analytics data reporting threshold.

8. The method of claim 7, wherein prior to transmitting the instruction to the video capturing device to lower the second video analytics data reporting threshold, the method comprising:
causing the video capturing device to report video analytics data as a function of the second video analytics data reporting threshold, wherein causing comprises:
determining that the first video analytics data point is greater than the second video analytics data reporting threshold and responsively causing the reporting of the first video analytics data point from the video capturing device; and
determining that the second video analytics data point is lower than the second video analytics data reporting threshold and responsively refraining from reporting the second video analytics data point from the video capturing device.

9. The method of claim 8, wherein after transmitting the instruction to the video capturing device to lower the second video analytics data reporting threshold, the method comprising:
causing the video capturing device to report video analytics data as a function of the first video analytics data reporting threshold, wherein causing comprises:
determining that the second video analytics data point is greater than the first video analytics data reporting threshold and responsively causing the reporting of the second video analytics data point from the video capturing device.

10. The method of claim 1, wherein the instruction further includes a request to report video analytics data corresponding to a video stream captured by the video capturing device for a time duration corresponding to one or more of (i) prior to detecting the occurrence of the incident, (ii) during detecting the occurrence of the incident, or (iii) after detecting the occurrence of the incident.

11. The method of claim 1, wherein the instruction further includes a request for the video capturing device to forward the first video analytics data reporting threshold to one or more other video capturing devices that are within a communication range of the video capturing device and further deployed within the predetermined distance from the incident location.

12. The method of claim 1, wherein determining first video analytics data reporting threshold comprises:
identifying an incident type of the incident based on processing the video data or sensor data captured corresponding to the incident location; and
accessing a video analytics data reporting threshold database that maps each of a plurality of incident types to a different video analytics data reporting threshold; and
selecting a video analytics data reporting threshold that is mapped corresponding to the identified incident type as the first video analytics data reporting threshold.

13. The method of claim 1, wherein responsive to transmitting the instruction to the video capturing device to lower the second video analytics data reporting threshold to the first video analytics data reporting threshold, the method comprising:
determining a change in an incident type of the incident based on processing an updated video data or updated sensor data that are captured corresponding to the incident location;

determining an updated video analytics data reporting threshold based on the change in the incident type;

determining that the updated video analytics data reporting threshold is lower than the first video analytics data reporting threshold; and transmitting a second instruction to the video capturing device to lower the first video analytics data reporting threshold configured at the video capturing device to the updated video analytics data reporting threshold and further report video analytics data corresponding to a video stream captured by the video capturing device as a function of the updated video analytics data reporting threshold.

14. An electronic computing device, comprising:

an electronic processor; and a communications unit communicatively coupled to the electronic processor, wherein the electronic processor is configured to:

detect occurrence of an incident at an incident location based on processing video data or sensor data that are captured corresponding to the incident location;

identify a video capturing device that is deployed within a predetermined distance from the incident location;

determine a first video analytics data reporting threshold for reporting video analytics data from the video capturing device in response to the detected incident;

determine whether the video capturing device is currently configured with a second video analytics data reporting threshold that is greater than the first video analytics data reporting threshold; and responsive to determining that the video capturing device is currently configured with a second video analytics data reporting threshold that is greater than the first video analytics data reporting threshold, transmit, via the communications unit, an instruction to the video capturing device to lower the second video analytics data reporting threshold to the first video analytics data reporting threshold and further report video analytics data corresponding to a video stream captured by the video capturing device as a function of the first video analytics data reporting threshold.

15. The electronic computing device of claim 14, further comprising:

a memory storing a video analytics data reporting threshold database that maps each of a plurality of incident types to a different video analytics data reporting threshold, wherein the electronic processor is configured to:

identify an incident type of the incident based on processing the video data or sensor data captured corresponding to the incident location; and access the video analytics data reporting threshold database to select a video analytics data reporting threshold that is mapped corresponding to the identified incident type as the first video analytics data reporting threshold.

16. The electronic computing device of claim 14, wherein the electronic processor is configured to refrain from transmitting an instruction to the video capturing device to lower the second video analytics data reporting threshold that is currently configured at the video capturing device when it is determined that the video capturing device is currently configured with a second video analytics data reporting threshold that is not greater than the first video analytics data reporting threshold.

17. The electronic computing device of claim 14, wherein the electronic processor is configured to cause the video capturing device to report only a subset of the video analytics data extracted from video stream captured by the video capturing device, wherein the subset of the video analytics data is associated with video analytics data points that are greater than the first video analytics data reporting threshold.

18. The electronic computing device of claim 17, wherein the electronic processor is configured to cause the video capturing device to play back an indication of a visual or audio alert corresponding to the subset of the video analytics data via a corresponding display or audio output device communicatively coupled to the video capturing device.

19. The electronic computing device of claim 14, wherein the instruction further includes a request to report video analytics data corresponding to a video stream captured by the video capturing device for a time duration corresponding to one or more of (i) prior to detecting the occurrence of the incident, (ii) during detecting the occurrence of the incident, or (iii) after detecting the occurrence of the incident.

20. The electronic computing device of claim 14, wherein the instruction further includes a request for the video capturing device to forward the first video analytics data reporting threshold to one or more other video capturing devices that are within a communication range of the video capturing device and further deployed within the predetermined distance from the incident location.

* * * * *